United States Patent
Kishino et al.

[11] 3,859,393
[45] Jan. 7, 1975

[54] O-PHENYL-S-PROPYL-N-ALKYL PHOSPHOROAMIDE DITHIOATES

[75] Inventors: Shigeo Kishino, Tokyo; Akio Kudamatsu, Kanagawa; Shozo Sumi, Tokyo; Kozo Shiokawa, Kanagawa, all of Japan

[73] Assignee: Bayer Aktiengesellschaft, Leverkusen, Germany

[22] Filed: Aug. 3, 1972

[21] Appl. No.: 277,827

[30] Foreign Application Priority Data
Aug. 11, 1971 Japan............................... 46-60233

[52] U.S. Cl............... 260/949, 260/959, 424/216, 424/220
[51] Int. Cl........................... A01n 9/36, C07f 9/18
[58] Field of Search............................. 260/949, 959

[56] References Cited
FOREIGN PATENTS OR APPLICATIONS
185,345  10/1966  U.S.S.R............................. 260/959

Primary Examiner—Lorraine A. Weinberger
Assistant Examiner—Richard L. Raymond
Attorney, Agent, or Firm—Burgess, Dinklage & Sprung

[57] ABSTRACT

O-phenyl-S-propyl-N-alkyl phosphoroamido dithioates of the formula

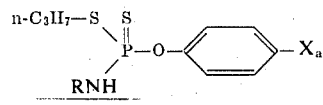

in which
R is lower alkyl,
a is 0 to 2, and
X is halogen, lower alkyl or methylmercapto, which possess insecticidal, acaricidal and nematocidal properties.

8 Claims, No Drawings

O-PHENYL-S-PROPYL-N-ALKYL PHOSPHOROAMIDE DITHIOATES

The present invention relates to and has for its objects the provision of particular new 0-phenyl-S-propyl-N-alkyl phosphoroamido dithioates, i.e., 0 -(optionally mono- or di-halo, -lower alkyl and/or -methylmercapto-substituted)-phenyl-S-n-propyl-N-lower alkyl-phosphoroamido dithioates, which possess insecticidal, acaricidal and nematocidal properties, active compositions in the form of mixtures of such compounds with solid and liquid dispersible carrier vehicles, and methods for producing such compounds and for using such compounds in a new way especially for combating pests, e.g., insects, acarids and nematodes, with other and further objects becoming apparent from a study of the within specification and accompanying examples.

Needless to say, agricultural chemicals, in particular pesticides, should have an excellent activity and exhibit a positive effect while showing only a low phytotoxicity to the cultivated plants to which they are applied; it is also important that they should be harmless to humans. For instance, Parathion, which has heretofore been used in great quantities for controlling insects harmful to rice plants, such as rice stem borers, planthoppers and leafhoppers, is very effective as an insecticide but it exhibits a high toxicity towards humans and domestic animals. Accordingly, the use of Parathion is now prohibited in some countries.

Furthermore, organic phosphorus chemicals, such as Parathion, EPN, Baycid and Sumithion, organic chlorine chemicals, such as BHC and DDT, and carbamate chemicals, such as Sevin, have been used in great quantities for controlling harmful insects for a long time, and there has now been observed an undesired phenomenon that harmful insects have acquired resistance to these chemicals.

Thus, there has been a demand for the development of novel agricultural chemicals that exhibit toxicity selectively to harmful insects, while showing no toxicity to warm-blooded animals, and that are effective for controlling harmful insects that have acquired resistance to the chemical agents used hitherto.

The present invention provides, as new compounds, the dithiophosphoric acid ester amides of the general formula

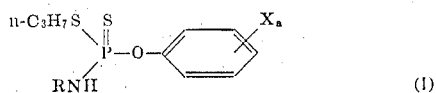

(I)

in which
R is lower alkyl,
$a$ is 0 to 2, and
X is halogen, lower alkyl or methylmercapto.

Examples of the lower alkyl radicals R and X are the $C_1$–$C_4$ alkyl radicals, namely methyl, ethyl, n-propyl, isopropyl, n-butyl, isobutyl, sec.-butyl and tert.-butyl.

The present invention also provides a process for the production of a compound of the formula (I) above, in which (a) n-propylmercaptan of the formula $$n—C_3H_7SH \quad (II)$$

is reacted, in the form of a metal salt thereof or in the presence of an acid-binding agent, with an amidothionophosphoryl chloride of the general formula

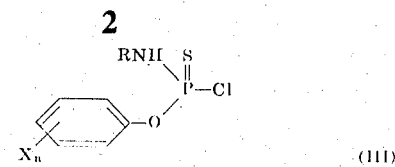

(III)

in which
R, X and $a$ have the meanings stated above, or (b) an amidodithiophosphoric acid salt of the general formula

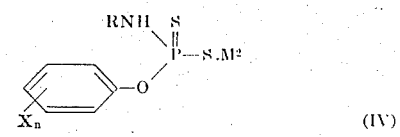

(IV)

in which
R, X and $a$ have the meanings stated above, and
$M^2$ is ammonium, a univalent metal cation or a fraction of a polyvalent metal cation,
is reacted with an n-propyl halide of the general formula $$n—C_3H_7.Hal \quad (V)$$

in which
Hal is halogen.

When n-propylmercaptan is used as such in process variant (a), any customary acid-acceptor may be used as the acid-binding agent, for example an alkali metal hydroxide, carbonate, bicarbonate or alcoholate or a tertiary amine, such as triethylamine, diethylaniline or pyridine.

The intended product can also be obtained with high purity and in a high yield, in the absence of an acid-binding agent, by first obtaining a metal salt, preferably an alkali metal salt (the sodium or potassium salt is conveniently used), of n-propylmercaptan and then reacting the salt with the amidothionophosphoryl chloride (III).

As examples of the amidothionophosphoryl chlorides of the formula (III) to be used in process variant (a), there may be mentioned N-ethyl-0-phenyl, N-methyl-0-(4-chloro-phenyl), N-ethyl-0-(4-chlorophenyl)-, N-isopropyl-0-(4-chlorophenyl)-, N-methyl-0-(2,4-dichlorophenyl)-, N-ethyl-0-(2,4-dichlorophenyl)-, N-isopropyl-0-(2,4-dichlorophenyl)-, N-ethyl-0-(4-tert.-butylphenyl)-, N-isopropyl-0-(4-tert.-butylphenyl)-, N-methyl-0-(4-methylmercaptophenyl)- and N-isopropyl-0-(4-methylmercaptophenyl)-amidothionophosphoryl chlorides.

The reaction in process variant (a) is illustrated by the following equation:

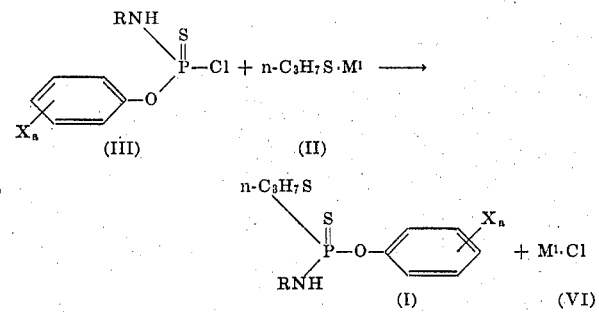

in which
R, X and $a$ have the meanings stated above, and
$M^1$ is hydrogen or a metal atom.

As examples of the amidodithiophosphoric acid salts of the formula (IV) to be used in process variant (b), there may be mentioned the sodium, potassium and ammonium salts of N-ethyl-0-phenyl-, N-methyl-0-(4-chlorophenyl)-, N-isopropyl-0-(4-chlorophenyl)-, N-methyl-0-(2,4-dichlorophenyl)-, N-ethyl-0-(2,4-dichlorophenyl)-, N-isopropyl-0-(2,4-dichlorophenyl)-, N-ethyl-0-(4-tert.-butylphenyl)-, N-isopropyl-0-(4-tert.-butylphenyl)-, N-methyl-0-(4-methylmercaptophenyl)-, N-isopropyl-0-(4-methylmercaptophenyl)- and N-butyl-0-(3 chloro-5methylphenyl)-amidodithiophosphoric acids.

Examples of the halides of the formula (V) are $n$-propyl bromide, $n$-propyl chloride and $n$-propyl iodide.

The reaction in process variant (b) may be illustrated by the following equation:

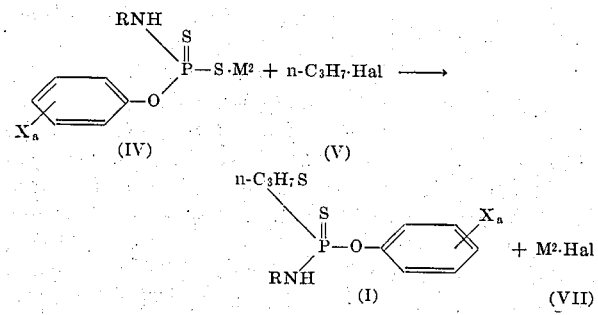

in which

R, X and $a$ are as defined above, $M^2$ is a metal atom or an ammonium group, and Hal is fluorine, chlorine, bromine or iodine.

It is preferred that both process variant (a) and process variant (b) should be carried out in the presence of a solvent or diluent. For this purpose any inert solvent or diluent may be used, for example water; an aliphatic, aromatic or alicyclic hydrocarbon (which may be chlorinated), such as hexane, cyclohexane, petroleum ether, ligroin, benzene, toluene, xylene, methylene chloride, chloroform, carbon tetrachloride, ethylene mono-, di- or trichloride or chlorobenzene; an ether, such as diethyl ether, methyl ethyl ether, diisopropyl ether, dibutyl ether, ethylene oxide, dioxane or tetrahydrofuran; a ketone, such as acetone, methyl ethyl ketone, methyl isobutyl ketone or methyl isopropyl ketone; a nitrile, such as acetonitrile, propionitrile or acrylonitrile; and alcohol, such as methanol, ethanol, isopropanol, butanol or ethylene gylcol; an ester, such as ethyl acetate or amyl acetate; an acid amide such as dimethyl formamide or dimethyl acetamide; a sulfoxide or sulfone such as dimethyl sulfoxide or sulfolane; or a base, such as pyridine.

In either of the above process variants, the reaction may be effected at a temperature within a fairly broad range; generally, the reaction is carried out at about $-20°C$ to the boiling point of the reaction mixture, preferably at about 0° to 100°C or to the boiling point of the reaction mixture, whichever is the lower.

It is preferred that the reaction should be conducted under atmospheric pressure, although it is possible to conduct the reaction under reduced or elevated pressures.

The compounds of the formula (I) have been found to exhibit excellent insecticidal, acaricidal and nematocidal activities; they have a particularly noteworthy activity against mites that have acquired a resistance to various organic phosphorus compounds of the prior art. Surprisingly, the S-$n$-propyl compounds of this invention exhibit a higher activity than analogous S-lower alkyl compounds.

The active compounds of this invention exhibit positive pesticidal effects without showing any phytotoxicity to cultivated plants; their pesticidal effects set in quickly and their activity may be maintained for a long period of time. Accordingly, they can be used for controlling pests such as sucking insects, biting insects, mites and nematodes.

For instance, the active compounds of this invention are effective for controlling harmful insects belonging to the Coleoptera, for example the small rice weevil, flour beetle (*Tribolium castaneum*), barley wireworm and soy bean beetle; insects belonging to the Lepidoptera, such as the gypsy moth, tent caterpillar, common cabbageworm, cotton leaf worm (*Prodenia litura*), rice stem borer, smaller tea tortrix and almond moth; insects belonging to the Hemiptera, such as the green rice leafhopper, brown planthopper, comstock mealybug, arrowhead scale, green peach aphid, apple aphid and cabbage aphid, insects belonging to the Orthoptera, such as the German cockroach, American cockroach and African mole cricket; and insects belonging to the Diptera, for example the house fly (*Musca domestica*), the yellow fever mosquito, the seed-corn maggot, the northerm house mosquito (*Culex pipiens*), the Chinese malaria mosquito (*Anopheles sinensis*) and the smaller house mosquito (*Culex tritaeniorhynchus*).

The compounds are also active against acarids, such as the two-spotted spider mite, citrus red mite and Japanese citrus rust mite, and nematodes, such as the southern root-knot nematode, rice white-tip nematode and soy bean cyst nematode (*Heterodera glycines*).

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Possible adjuvants include organic matter, stabilizers, adhesive agents, for example soap, calcium caseinate, sodium alginate, polyvinyl alcohol, steeping agents, coumarone (or indene) resins or polyvinyl butyl ether, combustible materials (for fumigants), for example nitrites, zinc dust or dicyandiamide, oxygen-yielding substances, for example perchlorates or dichromates, phytotoxicity-reducing substances, for example zinc sulfate, ferrous chloride or copper nitrate, substances for prolonging the biological effect, for example chlorinated terphenyls, emulsion-stabilizing substances, for example casein, gum tragacanth and carboxymethyl cellulose (polyvinyl alcohol also being suitable for this purpose), and synergistic agents.

The active compounds may be employed alone or in the form of mixtures with one another and/or with such solid and/or liquid dispersible carrier vehicles and/or with other known compatible active agents, especially plant protection agents, such as other acaricides, insecticides and nematocides, or fungicides, bactericides, rodenticides, herbicides, fertilizers, growth-regulating agents, anti-viral agents, attractants, etc. (which classes of substances include phosphoric acid esters, carbamates, dithio-(or dithiol-) carbamates, chlorinated organic compounds, dinitro compounds, organosulfur and organometallic compounds, antibiotics, substituted diphenyl ethers, ureas and triazine compounds), if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–41 95 percent by weight, and preferably 0.5–90 percent by weight, of the mixture, whereas carrier composition mixtures suitable for direct application or field application generally contemplate those in which the active compound is present in an amount substantially between about 0.0001–20 percent, preferably 0.005–10 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent, and preferably 0.1–95 percent, by weight of the mixture.

The active compounds can also be used in accordance with the well known ultra-low volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 3 to 1000 g/hectare, preferably 30 to 600 g/hectare, are sufficient. In this process it is possible to use highly concentrated liquid compositions with said liquid carrier vehicles containing from about 20 to about 95 percent by weight of the active compound or even the 100 percent active substance alone, e.g., about 20–100 percent by weight of the active compound.

Furthermore, the present invention contemplates methods of selectively killing, combating or controlling pests, e.g., insects, acarids and nematodes, which comprises applying to at least one of correspondingly (a) such insects, (b) such acarids, (c) such nematodes and (d) the corresponding habitat thereof, i.e., the locus to be protected, a correspondingly combative or toxic amount, i.e., an insecticidally, acaricidally or nematocidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

In 130 ml of toluene, 8.5 g of n-propylmercaptan were reacted with metallic sodium to form the sodium salt of n-propylmercaptan.

The solution was cooled to below 10°C, and 32 g of 0-(2,4-dichlorophenyl)-N-isopropylamidothionophosphoryl chloride were added dropwise to the solution with agitation of the latter. After completion of the dropwise addition, the temperature of the reaction mixture was gradually raised, and the reaction was allowed to proceed at 70°C for 2 hours. The reaction mixture was allowed to stand for a while at room temperature; it was washed with water and a 1 percent potassium carbonate solution several times and then dried over anhydrous sodium sulfate. Distillation of the toluene gave 31 g of a colorless oil, 0-(2,4-dichlorophenyl)-S-n-propyl-N-isopropylphosphoroamido dithioate, characterized by a boiling point of 155°–158°C/0.1 mm Hg and a refractive index $n_D^{20}$ of 1.5764. The product is hereinafter referred to as compound No. 7 and has the formula:

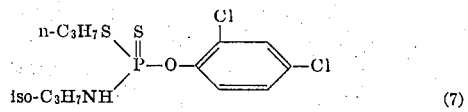

(7)

EXAMPLE 2

13 grams of n-propyl bromide were added to a mixture of 29 g of potassium 0-(4-methylmercaptophenyl)-N-isopropylamidodithiophosphate and 80 ml of acetonitrile; the mixture was heated at 60°C for 3 hours to effect the reaction. After completion of the reaction, acetonitrile was distilled off under reduced pressure, and benzene was added to the residue. The mixture was washed with water and a 1 percent potassium carbonate solution and dried over anhydrous sodium sulfate. Distillation of benzene gave 30 g of a colorless oil, 0-(4-methylmercaptophenyl)-S-n-propyl-N-isopropylphosphoroamido dithioate, characterized by a boiling point of 165°– 170°C/0.1 mm Hg and a refractive index $n_D^{20}$ of 1.5961. The product is hereinafter referred to as compound No. 11 and has the formula:

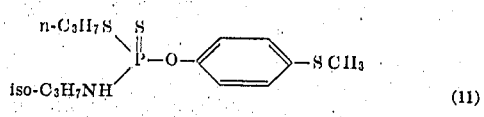

(11)

EXAMPLE 3

Active compounds prepared by methods analogous to the above-described methods are shown in the following Table.

TABLE I $$\begin{array}{c} n\text{-}C_3H_7S \\ \diagdown \\ RNH \end{array} \overset{S}{\underset{\diagup}{P}}-O-\!\!\!\!\bigcirc\!\!\!\!-X_n$$

| Compound No. | R | $X_n$ | Boiling point (° C./mm. Hg) | Refractive index ($n_D^{20}$) |
|---|---|---|---|---|
| 1 | $C_2H_5$ | — | 150–153/0.15 | 1.5758 |
| 2 | $CH_3$ | 4-Cl | 146–150/0.15 | 1.5911 |
| 3 | $C_2H_5$ | 4-Cl | 154–157/0.13 | 1.5813 |
| 4 | iso-$C_3H_7$ | 4-Cl | 137–140/0.05 | 1.5719 |
| 5 | $CH_3$ | 2,4-$Cl_2$ | 143–146/0.1 | 1.5983 |
| 6 | $C_2H_5$ | 2,4-$Cl_2$ | 146–150/0.1 | 1.5870 |
| 8 | $C_2H_5$ | 4-tert-$C_4H_9$ | 155–158/0.13 | 1.5571 |
| 9 | iso-$C_3H_7$ | 4-tert-$C_4H_9$ | 140–142/0.08 | 1.5486 |
| 10 | $CH_3$ | 4-$CH_3S$— | 165–168/0.15 | 1.6151 |

The compositions of this invention are illustrated in and by the following Examples, in which the active compounds of this invention are identified by the numbers assigned to them in Examples 1–3.

EXAMPLE 4 (Wettable Powder)

15 parts of compound No. 2, 80 parts of a 1:5 mixture of diatomaceous earth and kaolin and 5 parts of an emulsifier, "Runnox" (a polyoxyethylene alkyl aryl ether) were ground and mixed together to form a wettable powder. It was diluted with water to a concentration of 0.05 percent before being applied.

EXAMPLE 5 (Emulsifiable Liquor)

30 parts of compound No. 1, 30 parts of xylene, 30 parts of "Kawakazol" (methylnaphthalene) and 10 parts of an emulsifier, "Sorpol" (a polyoxyethylene alkyl aryl ether) were mixed by stirring to form an emulsifiable liquor. It was diluted with water to a concentration of 0.05 percent before being applied by spraying.

EXAMPLE 6 (Dust)

2 parts of compound No. 5 and 98 parts of a 1:3 mixture of talc and clay were ground and mixed together to form a dust. The dust was applied by scattering.

EXAMPLE 7 (Dust)

1.5 parts of compound No. 10, 0.5 part of isopropyl hydrogen phosphate and 98 parts of a 1:3 mixture of talc and clay were ground and mixed together to from a dust. The dust was applied by scattering.

EXAMPLE 8 (Granules)

25 parts of water were added to a mixture of 10 parts of compound No. 6, 10 parts of bentonite, 78 parts of a 1:3 mixture of talc and clay and 2 parts of lignin sulfonate. The mixture was intimately blended and finely divided by means of an extruding granulator to obtain granules of 20 – 40 mesh, followed by drying at 40°–50°C. The resulting granules were applied by spraying.

EXAMPLE 9 (Granules)

95 parts of clay particles of a size distribution of 0.2 – 2 mm were part into a rotary mixer and a solution of 5 parts of compound No. 3 in an organic solvent was sprayed onto the particles while they were being rotated, thereby wetting the particles homogeneously. They were then dried at 40°–50°C to form coated granules, which were applied by spraying.

EXAMPLE 10 (Oil Preparation)

0.5 part of compound No. 9, 20 parts of "Velsicol AR-50" (methylnaphthalene) and 79.5 parts of "Deobase" (deodorized kerosene) were mixed by stirring to form an oil preparation. It was applied by spraying.

Compared with active compounds of similar structures that have been described in the literature or known compounds exhibiting similar activities, the active compounds of this invention are characterized by substantially improved effects and a very low toxicity to warm-blooded animals. Accordingly, the compounds of this invention are of great utility.

The pesticidal activity of the compounds of this invention is illustrated in and by the following test Examples in which the active compounds of this invention are identified by the numbers assigned to them in the preparative Examples 1 – 3.

EXAMPLE 11

Test on effects against the two-spotted mite:

Preparation of Sample Formulation

Solvent: 3 parts by weight of dimethyl formamide
Emulsifier: 1 part by weight of alkylaryl polyglycol ether In order to prepare a suitable formulation of the active compound, one part by weight of the active compound is mixed with the above amount of the solvent containing the above amount of the emulsifier, and the mixture is diluted with water to form an aqueous formulation containing the active compound at a prescribed concentration.

Test Procedure

Haricot plants, each having two developing leaves, planted in 6 cm diameter pots are infested with, per pot, 50 – 100 imagines and nymphs of the two-spotted spider mite. Two days after the infestation, an aqueous formulation containing the active compound at a prescribed concentration and which has been prepared in the manner described above, is sprayed in an amount of 40 ml per pot. Each pot is kept in a greenhouse for 10 days and the control effect is evaluated. The evaluation is expressed on the following scale:

Index
3: no living imago, nymph or egg
2: less than 5 percent of living imagines, nymphs and eggs, based on the untreated control
1: 5 – 50 percent of living imagines, nymphs and eggs, based on the untreated control
0: more than 50 percent of living imagines, nymphs and eggs, based on the the untreated control
The results are shown in Tables II and III.

TABLE II

Results of comparative tests of the activities against the two-spotted spider mite of compounds of this invention and analogous compounds

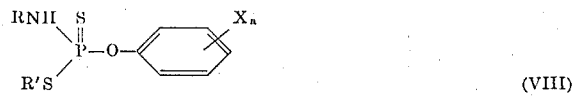

(VIII)

| R | R' | $X_a$ | Active ingredient concentration (percent) | Two-spotted spider mite | |
|---|---|---|---|---|---|
| | | | | Resistant to organic phosphorus chemicals | Susceptible to organic phosphorus chemicals |
| $CH_3$ | $CH_3$ | 4-Cl (Comparison) | 0.1 | 1 | 3 |
| | | | 0.03 | 0 | 2 |
| | | | 0.01 | 0 | 0 |
| $CH_3$ | $C_2H_5$ | ..do.. | 0.1 | 2 | 3 |
| | | | 0.03 | 0 | 1 |
| | | | 0.01 | 0 | 0 |
| $CH_3$ | $n-C_3H_7$ | 4-Cl (Compound No. 2) | 0.1 | 3 | 3 |
| | | | 0.03 | 3 | 3 |
| | | | 0.01 | 3 | 3 |
| | | | 0.003 | 3 | 3 |
| | | | 0.001 | 2 | 1 |
| $CH_3$ | $n-C_4H_9$ | 4-Cl (Comparison) | 0.1 | 3 | 3 |
| | | | 0.03 | 2 | 3 |
| | | | 0.01 | 1 | 2 |
| $CH_3$ | $n-C_6H_{13}$ | ..do.. | 0.1 | 2 | 3 |
| | | | 0.03 | 1 | 1 |
| | | | 0.01 | 0 | 0 |
| $CH_3$ | $C_2H_5$ | 2,4-$Cl_2$ (Comparison) | 0.1 | 3 | 3 |
| | | | 0.03 | 1 | 2 |
| | | | 0.01 | 0 | 1 |
| $CH_3$ | $n-C_3H_7$ | 2,4-$Cl_2$ (Compound No. 5) | 0.1 | 3 | 3 |
| | | | 0.03 | 3 | 3 |
| | | | 0.01 | 3 | 3 |
| | | | 0.003 | 2 | 3 |
| | | | 0.001 | 1 | 1 |
| $CH_3$ | $n-C_4H_9$ | 2,4-$Cl_2$ (Comparison) | 0.1 | 3 | 3 |
| | | | 0.03 | 2 | 2 |
| | | | 0.01 | 1 | 1 |
| | | | 0.003 | 0 | 0 |
| $iso-C_3H_7$ | $C_2H_5$ | ..do.. | 0.1 | 2 | 3 |
| | | | 0.03 | 1 | 1 |
| | | | 0.01 | 0 | 0 |
| $iso-C_3H_7$ | $n-C_3H_7$ | 2,4-$Cl_2$ (Compound No. 7) | 0.1 | 3 | 3 |
| | | | 0.03 | 3 | 3 |
| | | | 0.01 | 3 | 3 |
| | | | 0.003 | 3 | 3 |
| | | | 0.001 | 2 | 2 |
| $iso-C_3H_7$ | $n-C_4H_9$ | 2,4-$Cl_2$ (Comparison) | 0.1 | 3 | 3 |
| | | | 0.03 | 2 | 3 |
| | | | 0.01 | 0 | 1 |
| $iso-C_3H_7$ | $C_2H_5$ | 4-$CH_3S$— (Comparison) | 0.1 | 3 | 3 |
| | | | 0.03 | 1 | 2 |
| | | | 0.01 | 0 | 0 |
| $iso-C_3H_7$ | $n-C_3H_7$ | 4-$CH_3S$— (Compound No. 11) | 0.1 | 3 | 3 |
| | | | 0.03 | 3 | 3 |
| | | | 0.01 | 3 | 3 |
| | | | 0.003 | 2 | 3 |
| | | | 0.001 | 1 | 1 |
| $iso-C_3H_7$ | $n-C_4H_9$ | 4-$CH_3S$ (Comparison) | 0.1 | 3 | 3 |
| | | | 0.03 | 1 | 3 |
| | | | 0.01 | 0 | 2 |

TABLE III

Results of tests of activities against two-spotted spider mites having a resistance to organic phosphorus chemicals

| Compound No. | Active Ingredient Concentration | | |
|---|---|---|---|
| | 0.1% | 0.03% | 0.01% |
| 1 | 3 | 3 | 2 |
| 3 | 3 | 3 | 3 |
| 4 | 3 | 3 | 3 |
| 6 | 3 | 3 | 3 |
| 8 | 3 | 3 | 2 |
| 9 | 3 | 3 | 2 |
| 10 | 3 | 3 | 2 |
| Metasystox (comparison commercially available) | 2 | 1 | 0 |

Note: Metasystox : O,O-dimethyl-S-(2-ethylthioethyl) phosphoro thiolate

EXAMPLE 12

Test on effects against cotton leaf worm larvae (*Prodenia litura*)
Test Procedure Sweet potato leaves are dipped in a formulation containing the active compound at the prescribed concentration and which has been prepared in the manner described in Example 11, they are then dried in air and placed in a 9 cm diameter Petri dish. 10 thied-instar cotton leaf worm larvae are put into the dish, which is then kept in a thermostat chamber maintained at 28°C. After 24 hours have passed, the number of the dead larvae is counted and the killing ratio is calculated. The results are shown in Table IV.

TABLE IV

Results of comparative tests of the activities of compounds of this invention and analogous compounds against the cotton leaf worm

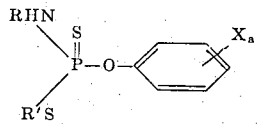

(VIII)

| R | R' | $X_a$ | Killing ratio (Percent) Active ingredient concentration | | | |
|---|---|---|---|---|---|---|
| | | | 0.1% | 0.03% | 0.01% | 0.003% |
| $CH_3$ | $CH_3$ | 4-Cl (Comparison) | 10 | 0 | 0 | 0 |
| $CH_3$ | $C_2H_5$ | ....do.... | 40 | 0 | 0 | 0 |
| $CH_3$ | n-$C_3H_7$ | 4-Cl (Compound No. 2) | 100 | 100 | 100 | 60 |
| $CH_3$ | n-$C_4H_9$ | 4-Cl (Comparison) | 50 | 0 | 0 | 0 |
| $CH_3$ | n-$C_6H_{13}$ | ....do.... | 0 | 0 | 0 | 0 |
| $CH_3$ | $C_2H_5$ | 2,4-$Cl_2$ (Comparison) | 20 | 0 | 0 | 0 |
| $CH_3$ | n-$C_3H_7$ | 2,4-$Cl_2$ (Compound No. 5) | 100 | 100 | 60 | 0 |
| $CH_3$ | n-$C_4H_9$ | 2,4-$Cl_2$ (Comparison) | 30 | 0 | 0 | 0 |
| $CH_3$ | $C_2H_5$ | 4-$CH_3$S- (Comparison) | 0 | 0 | 0 | 0 |
| $CH_3$ | n-$C_3H_7$ | 4-$CH_3$S- (Compound No. 10) | 100 | 100 | 100 | 90 |
| $CH_3$ | n-$C_4H_9$ | 4-$CH_3$S- (Comparison) | 10 | 0 | 0 | 0 |
| Dipterex (commercially available comparison) | | | 100 | 80 | 10 | 0 |

NOTE.—Dipterex: O,O-dimethyl-2,2,2-trichloro-1-hydroxyethyl phosphate.

EXAMPLE 13

Test of effects against the azuki bean weevil:
Test Procedure

A sheet of filter paper is spread in a Petri dish of 9 cm diameter and 1 ml of an aqueous diluted liquor containing the active compound at the determined concentration and which has been prepared in the same manner described in Example 11 is poured into the dish. Then 20 azuki bean weevils are put into the dish and the dish is kept for 24 hours in a thermostat chamber maintained at 28°C. The number of the dead weevils is counted and the killing ratio is calculated. Results are shown in Table V.

TABLE V

Results of tests of effects against the azuki bean weevil

| Compound No. | Killing Ratio (%) Active ingredient concentration | | |
|---|---|---|---|
| | 0.1% | 0.01% | 0.001% |
| 1 | 100 | 100 | 100 |
| 3 | 100 | 100 | 100 |
| Dipterex (commercially available comparison) | 100 | 30 | 0 |

EXAMPLE 14

Test of effects against the house fly.
Test Procedure

A sheet of filter paper is spread in a Petri dish of 9 cm diameter and 1 ml of an aqueous formulation, containing the active compound at the prescribed concentration and prepared in the manner described in Example 11, is poured into the dish. Then 10 female house-fly imagines are put into the dish and the dish is kept for 24 hours in a thermostat chamber maintained at 28°C. The number of the dead flies is counted and the killing ratio is calculated. The results are shown in Table VI.

TABLE VI

Results of tests on effect against the house fly

| Compound No. | Killing Ratio (%) Active Ingredient Concentration | |
|---|---|---|
| | 0.1% | 0.01 |
| 1 | 100 | 100 |
| 2 | 100 | 100 |
| 5 | 100 | 100 |
| 10 | 100 | 70 |
| DDT (commercially available comparison) | 100 | 20 |

EXAMPLE 15

Test on effects against root knot nematodes:
Preparation of Sample Formulation 2 parts by weight of the active compound are mixed with 98 parts by weight of talc and the mixture is ground to form a dust.

Test Procedure

The so-prepared formulation is mixed with soil, which is tainted with sweet potato root knot nematodes, in an amount such that a concentration of the active compound of 50 ppm is attained in the soil. The treated soil is stirred until uniform, and is then packed into pots, each having an area of 1/5000 are. About 20 tomato seeds (Kurihara variety) are sowed per pot and cultivated for 4 weeks in a greenhouse. Then each tomato was drawn out from the soil without damaging roots. The infestation grade caused by the nematodes was evaluated with respect to 10 tomatoes as one group based on the following scale.

Knot Index
0 . . . no knot (perfect control)
1 . . . knots are formed to a lightly
2 . . . knots are formed to a middling
3 . . . knots are formed to a considerable extent
4 . . . formation of knots is extreme The infestation grade is determined by the following equation:

$$\text{Infestation grade} = \frac{\Sigma (\text{rank value}) \times (\text{rank population})}{(\text{whole population examined}) \times 4} \times 100$$

Results are shown in Table VII

TABLE VII

Results of test on effects against root knot nematodes

| Compound No. | Infestation grade (%) |
|---|---|
| 2 | 0 |
| 5 | 0 |
| 10 | 7.3 |
| Terracur-P (commercially available comparison) | 8.8 |
| Untreated control | 80.2 |

Note: Terracur-P: O,O-diethyl-O-(4-methylsulfinyl phenyl) phosphorothioate

It will be appreciated that the instant specification and examples are set forth by way of illustration and not limitation, and that various modifications and changes may be made without departing from the spirit and scope of the present invention.

What is claimed is:

1. A dithiophosphoric acid ester amide of the formula $$\underset{RNH}{\overset{n-C_3H_7S}{\diagdown}} \overset{S}{\underset{\|}{P}} - O - \text{\textlangle phenyl\textrangle} - X_a$$

in which
R is lower alkyl
$a$ is 0 to 2, and
X is halogen, lower alkyl or methylmercapto.

2. The compound according to claim 1 wherein such compound is 0-(4-chlorophenyl)-S-n-propyl-N-methyl phosphoroamido dithioate of the formula $$\underset{CH_3NH}{\overset{n-C_3H_7S}{\diagdown}} \overset{S}{\underset{\|}{P}} - O - \text{\textlangle phenyl\textrangle} - Cl$$

3. The compound according to claim 1 wherein such compound is 0-(4-chlorophenyl)-S-n-propyl-N-ethyl phosphoroamido dithioate of the formula $$\underset{C_2H_5NH}{\overset{n-C_3H_7S}{\diagdown}} \overset{S}{\underset{\|}{P}} - O - \text{\textlangle phenyl\textrangle} - Cl$$

4. The compound according to claim 1 wherein such compound is 0-(2,4-dichlorophenyl)-S-n-propyl-N-methyl phosphoroamido dithioate of the formula $$\underset{CH_3NH}{\overset{n-C_3H_7-S}{\diagdown}} \overset{S}{\underset{\|}{P}} - O - \text{\textlangle 2,4-dichlorophenyl\textrangle}$$

5. The compound according to claim 1 wherein such compound is 0-(2,4-dichlorophenyl)-S-n-propyl-N-ethyl phosphoroamido dithioate of the formula $$\underset{C_2H_5NH}{\overset{n-C_3H_7S}{\diagdown}} \overset{S}{\underset{\|}{P}} - O - \text{\textlangle 2,4-dichlorophenyl\textrangle}$$

6. The compound according to claim 1 wherein such compound is 0-(2,4-dichlorophenyl)-S-n-propyl-N-isopropyl-phosphoroamido dithioate of the formula $$\underset{iso-C_3H_7NH}{\overset{n-C_3H_7S}{\diagdown}} \overset{S}{\underset{\|}{P}} - O - \text{\textlangle 2,4-dichlorophenyl\textrangle}$$

7. The compound according to claim 1 wherein such compound is 0-(4-methylmercaptophenyl)-S-n-propyl-N-methyl phosphoroamido dithioate of the formula $$\underset{CH_3NH}{\overset{n-C_3H_7S}{\diagdown}} \overset{S}{\underset{\|}{P}} - O - \text{\textlangle phenyl\textrangle} - SCH_3$$

8. The compound according to claim 1 wherein such compound is 0-(4-methylmercaptophenyl)-S-n-propyl-N-isopropyl phosphoroamido dithioate of the formula $$\underset{iso-C_3H_7NH}{\overset{n-C_3H_7S}{\diagdown}} \overset{S}{\underset{\|}{P}} - O - \text{\textlangle phenyl\textrangle} - SCH_3$$

* * * * *